C. L. BOWERS.
DIEING MACHINE.
APPLICATION FILED JULY 10, 1918.
1,322,525.
Patented Nov. 25, 1919.
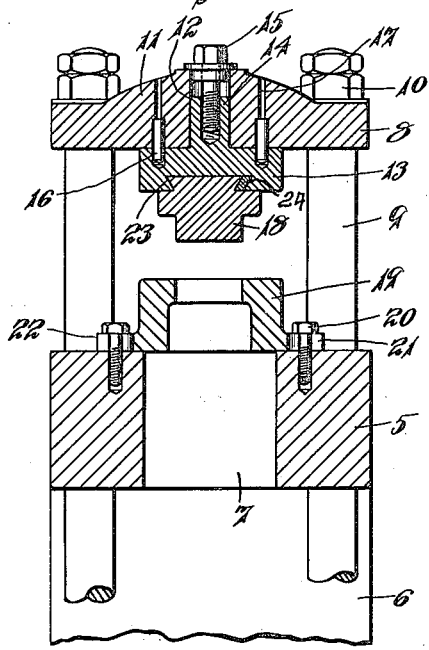
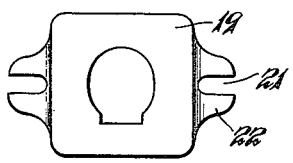
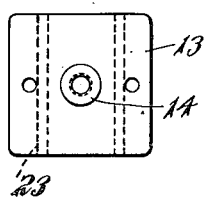
INVENTOR.
Charles L. Bowers,
BY
Arthur C. Jenkins,
ATTORNEY.

UNITED STATES PATENT OFFICE.

CHARLES L. BOWERS, OF HARTFORD, CONNECTICUT, ASSIGNOR TO DANIEL M. WRIGHT, OF HARTFORD, CONNECTICUT.

DIEING-MACHINE.

1,322,525.   Specification of Letters Patent.   Patented Nov. 25, 1919.

Application filed July 10, 1918. Serial No. 244,132.

*To all whom it may concern:*

Be it known that I, CHARLES L. BOWERS, a citizen of the United States, and a resident of Hartford, in the county of Hartford and State of Connecticut, have invented a new and Improved Dieing-Machine, of which the following is a specification.

This invention relates more especially to the class of machines used for stamping or cutting out pieces from sheet metal, and an object of the invention, among others, is to provide a machine that shall be extremely efficient in its action and in the use of which accurate work may be produced.

One form of device embodying the invention and in the construction and use of which the objects herein set out, as well as others, may be attained, is illustrated in the accompanying drawings, in which—

Figure 1 is a view in central vertical section through the upper part of a dieing machine embodying the invention, and looking toward the back of the machine.

Fig. 2 is a top plan view of one of the dies peculiar to this machine.

Fig. 3 is a top plan view of a holder for the other die and embodying the invention illustrated and described herein.

This invention is not limited to a dieing machine of any particular type, but as it has been embodied in a machine in which the power is applied below the table, such a machine has been selected for the purpose of a disclosure of the invention herein, only so much, however, of the machine being illustrated as is necessary to a clear understanding of the device, reference being had to Patent No. 1,270,913, dated July 2, 1918, for such further understanding of other parts of the machine as may be desired.

In the accompanying drawings the numeral 5 indicates a table supported upon end pieces 6, one only of which is shown herein, said table having an opening 7 through which the articles formed by the dies may fall. A die head 8 is secured to the upper end of columns 9 that extend through the table and that are reciprocated in a vertical direction as by means of a crank, eccentric or other suitable device (not shown herein) located underneath the table. Any suitable number of columns 9 may be employed, four being embodied in the structure illustrated herein, but Fig. 1 being a vertical section, only two are shown. The die head 8 is preferably of rectangular form and is secured to the columns in any suitable manner, nuts 10 being shown herein for this purpose. An enlargement 11 preferably of part spherical shape is formed on the upper side of the die head and an opening 12 extends through said head and through said enlargement, as shown in Fig. 1 of the drawings.

A die holder 13 is secured against the under side of the die head, said holder having a shank 14 fitting the opening 12, said shank having a screw threaded opening to receive a retaining screw 15 extending into the opening 12, said screw being headed or flanged to abut against the surface of the enlargement 11. Positioning pins 16 extend into recesses in the contiguous surfaces of the holder and head to properly position the die and prevent turning movement thereof. Holes 17 extend from the recesses in the die head to the upper surface thereof, through which a tool may be inserted to dislodge the pins from the head when necessary.

An upper die 18 is secured to the holder 13 in any suitable manner, a common and well known means embodying a dove-tailed projection on the die located in a similar shaped groove 23 in the holder being shown herein, with a gib 24 to secure the die in place.

A lower die 19 is adjustably held in place on the table 5 by means of screw bolts or similar fastening devices 20 passing through slots 21 extending inwardly from the ends of ears 22 at opposite sides of the die and at the lower part thereof, as shown in Fig. 1 of the drawings. It will be noted that the slots 21 extend in a direction substantially at right angles to the dove-tailed groove 23.

The work designed to be produced upon this improved machine is of such character as to require an accurate positioning of the dies one with respect to the other, the groove 23 enabling the die 18 to be adjusted in one direction and the slots 21 permitting the die 19 to be adjusted in another and substantially right angular direction. The die 18 is fixed in position by means of the pins 16, and the slots in the die 19 will permit any axial movement of the lower die to correctly position it with respect to the die 18, the slots being wide enough to provide a slight looseness of the bolts sufficient to permit the necessary adjustments of the lower die.

I claim:

1. A dieing machine embodying a relatively movable die head and table, a die supported on the table and having flanges with grooves extending laterally of the table, fastening means extending through said grooves into said table and secured directly thereto, a die holder having a shank extending into and fitting an opening in said head, said holder having a groove extending lengthwise of the table, a screw engaging said shank to secure the die holder in place, and means for securing a die in said groove for adjustment lengthwise of the table.

2. A dieing machine embodying a relatively movable die head and table, a die secured to said table, a die holder having a shank extending into and fitting a hole in said head, a screw engaging a threaded hole in said shank, said screw having a head to engage the upper surface of said die head, and means for securing the die to said holder.

3. A dieing machine embodying a relatively movable die head and table, a die secured to said table, a die holder having a shank extending into an opening in said head, means to engage said shank to retain said holder in place, a positioning pin located in a recess in the contiguous surfaces of said holder and head, and means for securing a die in said holder.

4. A dieing machine embodying a relatively movable die head and table, a die secured to said table, a die holder having a shank extending into a hole in said head, the latter having a positioning recess with a hole extending from the outer surface of the head into said recess, a positioning pin located in said recess and extending into a recess in the contiguous surface of the holder, and means for securing a die to the holder.

5. A dieing machine including a relatively movable die head and table, a die secured to said table and having ears oppositely arranged with slots therein, fastening members located in said slots to secure said die to the table, a die holder having a shank located in an opening in said head, means for retaining the shank in said opening, means for movably positioning a die in said head in a direction substantially at right angles to the adjusting movement of the opposite die, and pins located in the contiguous surfaces of said head and holder, said head having an opening extending into the pin recess therein.

CHARLES L. BOWERS.